(12) United States Patent
Wang et al.

(10) Patent No.: US 11,451,740 B1
(45) Date of Patent: Sep. 20, 2022

(54) VIDEO-IMAGE-INTERPOLATION APPARATUS AND METHOD FOR ADAPTIVE MOTION-COMPENSATED FRAME INTERPOLATION

(71) Applicant: Terawins, Inc., New Taipei (TW)

(72) Inventors: Yu-Kuang Wang, New Taipei (TW); Wen-Yi Huang, New Taipei (TW); Pei-Kai Hsu, New Taipei (TW)

(73) Assignee: TERAWINS, INC., New Taipei (TW)

( * ) Notice: Subject to any disclaimer, the term of this patent is extended or adjusted under 35 U.S.C. 154(b) by 0 days.

(21) Appl. No.: 17/523,138

(22) Filed: Nov. 10, 2021

(30) Foreign Application Priority Data

Apr. 21, 2021 (TW) .................................. 110114243

(51) Int. Cl.
*H04N 7/01* (2006.01)
*H04N 5/278* (2006.01)
(Continued)

(52) U.S. Cl.
CPC .......... *H04N 7/0137* (2013.01); *G06T 5/009* (2013.01); *G06T 5/40* (2013.01); *G06T 7/20* (2013.01);
(Continued)

(58) Field of Classification Search
CPC .... H04N 7/014; H04N 7/0137; H04N 7/0127; H04N 7/0135; H04N 7/01; H04N 5/272;
(Continued)

(56) References Cited

U.S. PATENT DOCUMENTS

| 8,184,200 B1 * | 5/2012 | Biswas | ................. | H04N 7/014 348/452 |
| 2010/0265393 A1 * | 10/2010 | Su | ......................... | H04N 7/012 348/452 |

FOREIGN PATENT DOCUMENTS

| CN | 102622975 A | 8/2012 |
| CN | 103563384 A | 2/2014 |
| CN | 107480670 A | 12/2017 |

* cited by examiner

*Primary Examiner* — Sherrie Hsia
(74) *Attorney, Agent, or Firm* — Muncy, Geissler, Olds & Lowe, P.C.

(57) ABSTRACT

A video-image-interpolation apparatus is provided, which includes at least three image-layering circuits, at least three motion-estimation circuits, a motion-estimation-filtering circuit, a motion-compensated frame-interpolation circuit, and a display-control circuit. Each motion-estimation circuit performs motion estimation on a reference image-layer sequence and a reference subtitle-layer sequence that are generated from an input video signal by each image-layering circuit. The motion-estimation-filtering circuit adaptively determines the motion-estimation circuit having the smallest motion error. The motion-compensated frame-interpolation circuit performs motion compensation to generate one or more interpolated image-layer images and one or more interpolated subtitle-layer images according to the motion vectors calculated by the motion-estimation circuit having the smallest motion error, and superimposes the one or more interpolated image-layer images and the one or more interpolated subtitle-layer images to generate interpolated images. The display-control circuit performs frame-rate conversion on the reference images and the interpolated images to obtain an output video signal.

20 Claims, 8 Drawing Sheets

(51) Int. Cl.
*H04N 5/272* (2006.01)
*G06T 5/40* (2006.01)
*G06T 7/20* (2017.01)
*G06T 5/00* (2006.01)

(52) U.S. Cl.
CPC ............ *H04N 5/272* (2013.01); *H04N 5/278* (2013.01); *H04N 7/014* (2013.01); *H04N 7/0127* (2013.01); *G06T 2207/10016* (2013.01); *G06T 2207/20021* (2013.01)

(58) Field of Classification Search
CPC .......... H04N 5/278; G06T 2207/10016; G06T 2207/20021; G06T 7/20; G06T 5/009; G06T 5/40
USPC ....... 348/441, 448, 451, 452, 699, 584, 586, 348/589, 598, 600
See application file for complete search history.

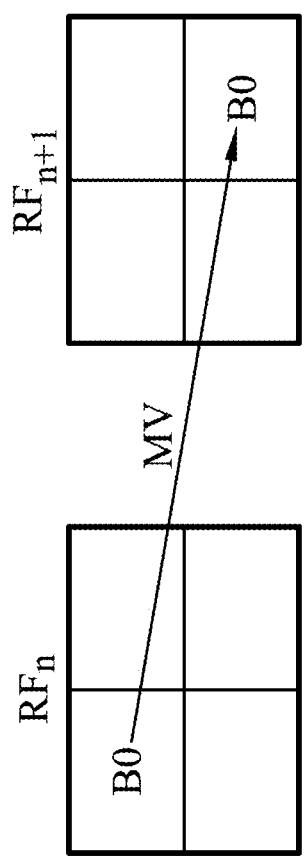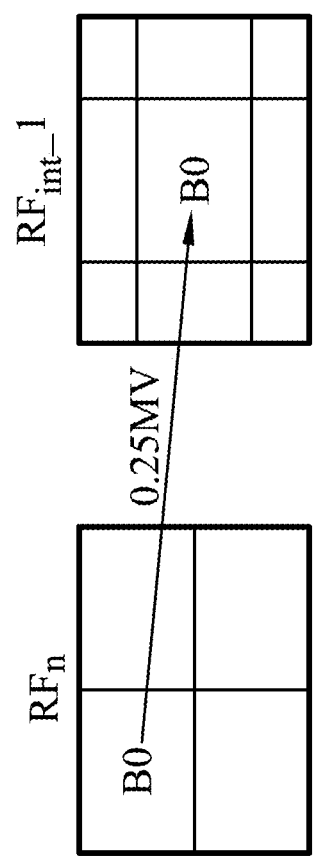
FIG. 5C
FIG. 5D

VIDEO-IMAGE-INTERPOLATION APPARATUS AND METHOD FOR ADAPTIVE MOTION-COMPENSATED FRAME INTERPOLATION

CROSS REFERENCE TO RELATED APPLICATIONS

This Application claims priority of Taiwan patent Application No. 110114243, filed on Apr. 21, 2021, the entirety of which is incorporated by reference herein.

BACKGROUND OF THE INVENTION

Field of the Invention

The present invention relates to video processing, and in particular, to a video-image-interpolation apparatus and a method of adaptive motion-compensated frame interpolation.

Description of the Related Art

When conventional video-image-interpolation apparatuses perform video-frame-rate conversion, they often use MEMC technology, which means motion estimation and motion compensation. However, with development of social-interaction-video technology, mobile subtitles, such as "bullet screens" or closing credits, are often added to video images. However, the motion vector of such moving captions is often different from the motion vector of the object in the image. Therefore, for conventional video-image-interpolation apparatuses, it is easy to cause poor MEMC calculation results, which may result in defective images.

Accordingly, there is demand for a video-image-interpolation apparatus and a method of adaptive motion-compensated frame interpolation to solve the aforementioned problem.

BRIEF SUMMARY OF THE INVENTION

In an exemplary embodiment, a video-image-interpolation apparatus is provided. The video-image-interpolation apparatus includes at least three image-layering circuits, at least three motion-estimation circuits, a motion-estimation-filtering circuit, a motion-compensated, and a display-control circuit. Each image-layering circuit performs a corresponding image-layering process on each image and its subsequent image in an input video signal to generate a first image layer and a first subtitle layer corresponding to each image, and to generate a second image layer and a second subtitle layer corresponding to the subsequent image. Each motion-estimation circuit obtains a reference image-layer sequence and a reference subtitle-layer sequence according to the first image layer and the first subtitle layer corresponding to each image, and obtains the second image layer and the second subtitle layer corresponding to the subsequent image generated by each image-layering process, wherein the reference image-layer sequence and the reference subtitle-layer sequence has an original frame rate. Each motion-estimation circuit performs motion estimation on each reference-image layer and its subsequent reference-image layer in the reference image-layer sequence to obtain a first motion vector corresponding to each block in each reference-image layer, and performs motion estimation on each reference-subtitle layer and its subsequent reference-subtitle layer in the reference subtitle-layer sequence to obtain a second motion vector corresponding to each block in each reference-subtitle layer. The motion-estimation-filtering circuit adaptively determines the first motion vector of each block in each reference-image layer and the second motion vector of each block in each reference-subtitle layer, that are generated by the motion-estimation circuit having the smallest motion error. The motion-compensated frame-interpolation circuit performs a motion-compensation process, according to the first motion vector of each block in each reference-image layer and the second motion vector of each block in each reference-subtitle layer, to generate one or more interpolated image-layer images between each reference-image layer and its subsequent reference-image layer, and to generate one or more interpolated subtitle-layer images between each reference-subtitle layer and its subsequent reference-subtitle layer. The motion-compensated frame-interpolation circuit superimposes the reference image-layer sequence and the reference subtitle-layer sequence to generate a plurality of reference images, and superimposes the one or more interpolated image-layer images and the one or more interpolated subtitle-layer images to generate one or more interpolated images. The display-control circuit performs a frame-rate-conversion process on the reference images and the interpolated images according to the original frame rate and a display frame rate of an output video signal displayed by the video-image-interpolation apparatus to obtain the output video signal. The display frame rate is higher than or equal to the original frame rate.

In some embodiments, the at least three image-layering circuits comprises a first image-layering circuit, a second image-layering circuit, and a third image-layering circuit, which respectively perform image layering on each image and its subsequent image in the input video signal using fixed-brightness layering, dynamic-brightness layering, and block-contrast layering to generate the first image layer and the first subtitle layer corresponding to each image, and to generate the second image layer and the second subtitle layer corresponding to the subsequent image.

In some embodiments, the first image-layering circuit converts each image of the input video signal into a grey-scale image. The first image-layering circuit labels pixels in the grey-scale image having grey-scale values greater than or equal to a brightness threshold as the first subtitle layer, and labels other pixels in the grey-scale image having grey-scale values less than the brightness threshold as the first image layer.

In some embodiments, the second image-layering circuit converts each image of the input video signal into a grey-scale image, and calculates statistics of the grey-scale image to obtain a histogram of the grey-scale image. The second image-layering circuit performs equalization on the histogram to obtain an equalized histogram, and labels pixels greater than or equal to a first filtering-threshold ratio in the equalized histogram as the first subtitle layer, and labels pixels less than the first filtering-threshold ratio in the equalized histogram as the first image layer.

In some embodiments, the third image-layering circuit converts each image of the input video signal into a grey-scale image, divides the grey-scale image into N*N blocks, and calculates statistics of each block to obtain a histogram corresponding to each block, where N is a positive integer greater than or equal to 2. The third image-layering circuit further performs equalization on the histogram corresponding to each block to obtain an equalized histogram corresponding to each block, and labels pixels greater than or equal to a second filtering-threshold ratio in the equalized histogram corresponding to each block as the first subtitle layer, and labels pixels less than the second filtering-threshold ratio in the equalized histogram corresponding to each block as the first image layer.

In some embodiments, the motion-estimation-filtering circuit performs motion compensation on each block in the reference-image layer and the reference-subtitle layer according to the first motion vector corresponding to each block in the reference-image layer and the second motion vector corresponding to each block in the reference-subtitle layer generated by each motion-estimation circuit to obtain a first motion-compensated image layer and a first motion-compensated subtitle layer. The motion-estimation-filtering circuit subtracts the subsequent reference-image layer and the subsequent reference-subtitle layer respectively from the first motion-compensated image layer and first motion-compensated subtitle layer to obtain an image-layer difference image and a subtitle-layer difference image. The motion-estimation-filtering circuit calculates a sum of absolute difference (SAD) of each pixel in the image-layer difference image and the subtitle-layer difference image as a motion error corresponding to each motion-estimation circuit. The motion-estimation-filtering circuit compares the motion error corresponding to each motion-estimation circuit to determine the motion-estimation circuit having the smallest motion error.

In some embodiments, the video-image-interpolation apparatus further includes a frame-interpolation-evaluation circuit for determining whether there is motion difference between each reference image and its subsequent reference image. In response to the frame-interpolation-evaluation circuit determining that there is motion difference between each reference image and its subsequent reference image, the frame-interpolation-evaluation circuit generates a motion-compensated-frame-interpolation enable signal at a high-logic state. In response to the frame-interpolation-evaluation circuit determining that there is no motion difference between each reference image and its subsequent reference image, the frame-interpolation-evaluation circuit generates the motion-compensated-frame-interpolation enable signal at a low-logic state.

In some embodiments, the frame-interpolation-evaluation circuit calculates a number M of images required for frame interpolation between each reference image and its subsequent reference image according to the original frame rate and the display frame rate, where M is natural number. In response to the motion-compensated frame-interpolation enable signal being in the high-logic state, the motion-compensated frame-interpolation circuit performs motion compensation to generate M interpolated image-layer images between each reference-image layer and its subsequent reference-image layer, and to generate M interpolated subtitle-layer images between each reference-subtitle layer and its subsequent reference-subtitle layer. In response to the motion-compensated frame-interpolation enable signal being in the low-logic state, the motion-compensated frame-interpolation circuit performs motion compensation to generate M interpolated subtitle-layer images between each reference-subtitle layer and its subsequent reference-subtitle layer.

In some embodiments, the motion-compensated frame-interpolation circuit organizes the reference images and the interpolated images into a first video sequence, and assigns a corresponding first timestamp to each image in the first video sequence, and the display-control circuit assigns a corresponding second timestamp to each output image.

In some embodiments, the display-control circuit compares the second timestamp of each output image and the first timestamp of a specific image in the first video sequence that is closest to each output image. When the second timestamp is earlier than the first timestamp, the display-control circuit selects a previous image of the specific image as the output image. When the second timestamp is later than or equal to the first timestamp, the display-control circuit selects the specific image as the output image.

In another exemplary embodiment, a method of adaptive motion-compensated frame interpolation is provided. The method includes the following steps: performing at least three image-layering processes on each image and its subsequent image in an input video signal, wherein each image-layering process generates a first image layer and a first subtitle layer corresponding to each image, and generates a second image layer and a second subtitle layer corresponding to the subsequent image; obtaining a reference image-layer sequence and a reference subtitle-layer sequence according to the first image layer and the first subtitle layer corresponding to each image, and the second image layer and the second subtitle layer corresponding to the subsequent image generated by each image-layering process, wherein the reference image-layer sequence and the reference subtitle-layer sequence has an original frame rate; for each image-layering process, performing motion estimation on each reference-image layer and its subsequent reference-image layer in the reference image-layer sequence to obtain a first motion vector corresponding to each block in each reference-image layer, and performing motion estimation on each reference-subtitle layer and its subsequent reference-subtitle layer in the reference subtitle-layer sequence to obtain a second motion vector corresponding to each block in each reference-subtitle layer; adaptively determining the first motion vector of each block in each reference-image layer and the second motion vector of each block in each reference-subtitle layer that are generated by the motion-estimation process having the smallest motion error; performing a motion-compensation process, according to the first motion vector of each block in each reference-image layer and the second motion vector of each block in each reference-subtitle layer, to generate one or more interpolated image-layer images between each reference-image layer and its subsequent reference-image layer, and to generate one or more interpolated subtitle-layer images between each reference-subtitle layer and its subsequent reference-subtitle layer; superimposing the reference image-layer sequence and the reference subtitle-layer sequence to generate a plurality of reference images, and superimposing the one or more interpolated image-layer images and the one or more interpolated subtitle-layer images to generate one or more interpolated images; and performing a frame-rate-conversion process on the reference images and the interpolated images according to the original frame rate and a display frame rate of an output video signal displayed by the video-image-interpolation apparatus to obtain the output video signal, wherein the display frame rate is higher than or equal to the original frame rate.

BRIEF DESCRIPTION OF THE DRAWINGS

The present invention can be more fully understood by reading the subsequent detailed description and examples with references made to the accompanying drawings, wherein:

FIG. 5C is a diagram showing a motion vector of a specific block from an image to a next image in accordance with an embodiment of the invention;

FIG. 5D is a diagram showing a motion vector of a specific block from an image to an interpolated image in accordance with an embodiment of the invention.

DETAILED DESCRIPTION OF THE INVENTION

The following description is made for the purpose of illustrating the general principles of the invention and should not be taken in a limiting sense. The scope of the invention is best determined by reference to the appended claims.

The following description is presented to enable one of ordinary skill in the art to make and use the invention, and is provided in the context of a patent application and its requirements. Various modifications to the embodiments and the generic principles and features described herein will be readily apparent to those skilled in the art. Thus, the present invention is not intended to be limited to the embodiments shown, but is to be accorded the widest scope consistent with the principles and features described herein.

Figure 1:
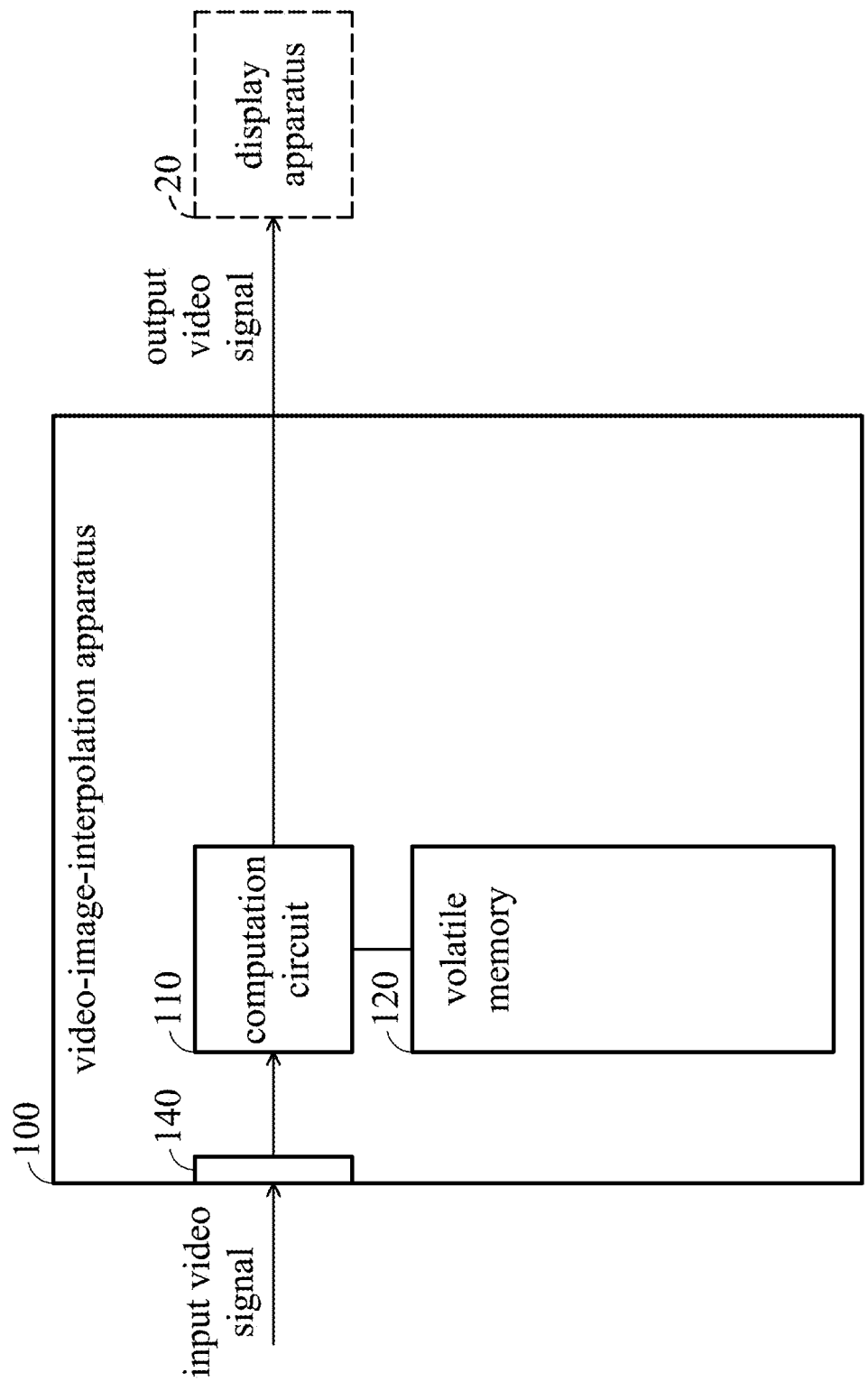
FIG. 1 is a diagram of a video-image-interpolation apparatus in accordance with an embodiment of the invention.

FIG. 1 is a diagram of a video-image-interpolation apparatus in accordance with an embodiment of the invention.

The video-image-interpolation apparatus 100 can be disposed in a television, a computer monitor, a projector, a smartphone, a tablet PC, a laptop computer, etc., to perform motion compensated-frame interpolation to perform frame rate conversion. In an embodiment, the video-image-interpolation apparatus 100 may include a computation circuit, a volatile-memory 120, and a transmission interface 140. The video-image-interpolation apparatus 100 may receive an input video signal via the transmission interface 140, wherein the input video signal has an input frame rate. The computation circuit 110 may perform motion-compensated frame interpolation to convert the input video signal into an output video signal, and displays the output video signal on a display apparatus 20 using a display frame rate, wherein the display frame rate is higher than or equal to the input frame rate. The display apparatus 20, for example, may be a television, a computer monitor, a projector, a smartphone, a tablet PC, or display screen of a laptop computer, but the invention is not limited thereto.

In some embodiments, the computation circuit 110 may be an application-specific integrated circuit (ASIC) or a logic circuit having equivalent function.

The volatile memory 120 may be implemented by a dynamic random access memory (DRAM) or a static random access memory (SRAM), but the invention is not limited thereto. The transmission interface 140, for example, may be an HDMI (high-definition multimedia interface) interface, a DisplayPort interface, or a VGA (video graphics array) interface, but the invention is not limited thereto. The volatile memory 120 may be used as an image buffer that stores images to be output to the display apparatus 20.

In an embodiment, an external device may superimposes the subtitles at the corresponding time point on top of each original image of a video sequence to obtain each image in the input video signal, so one or more images in the input video sequence of the input video signal may contain subtitles, wherein the subtitles may include fixed subtitles and/or mobile subtitles (e.g., "bullet screens" or closing credits).

Figure 2:
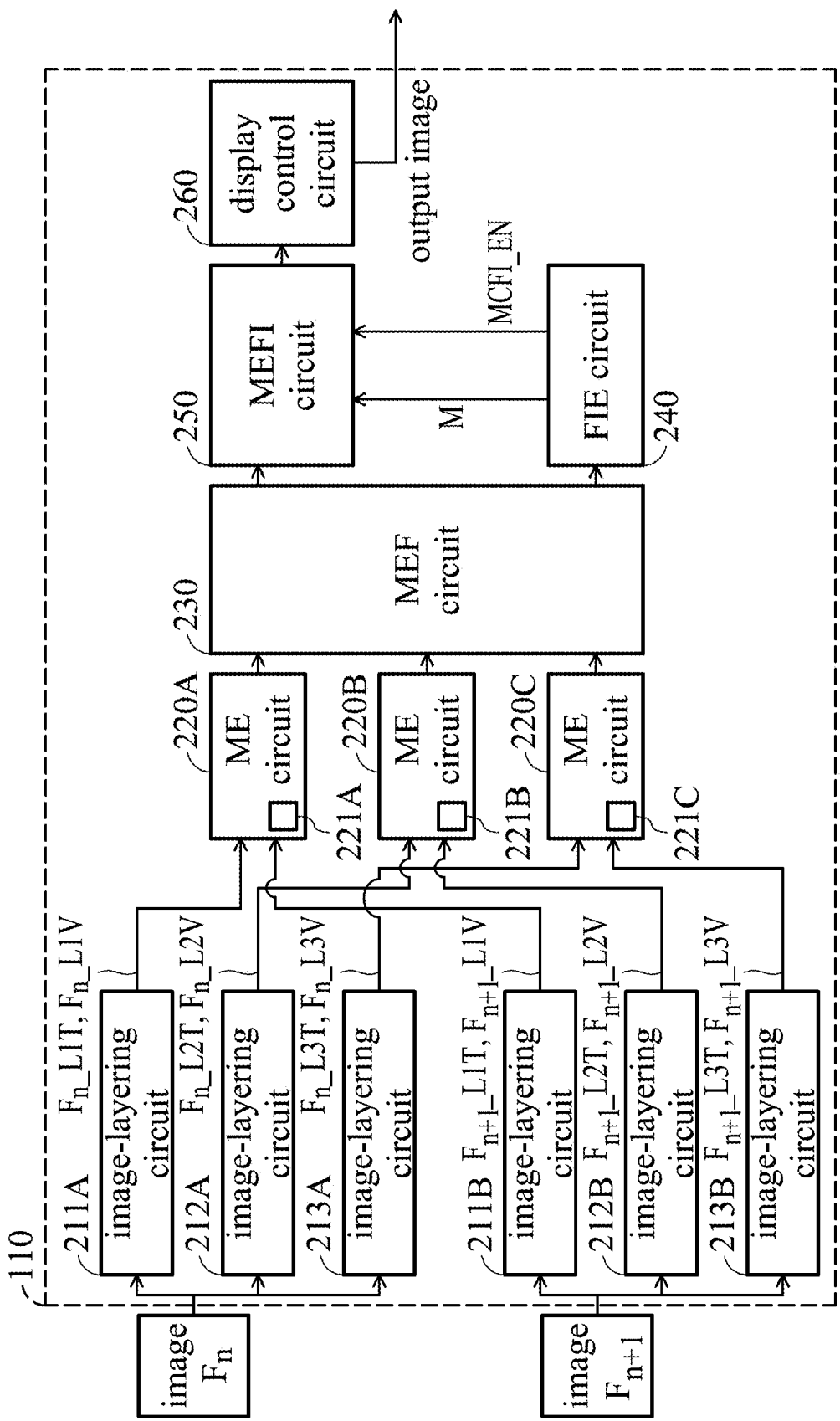
FIG. 2 is a diagram of the computation circuit in accordance with the embodiment of FIG. 1.

FIG. 2 is a diagram of the computation circuit in accordance with the embodiment of FIG. 1.

The computation circuit 110 may include image-layering circuits 221A-221B, 212A-212B, and 213A-213B, motion-estimation (ME) circuits 220A-220C, a motion-estimation-filtering (MEF) circuit 230, a frame-interpolation-evaluation (FIE) circuit 240, a motion-compensated-frame-interpolation circuit 250, and a display-control circuit 260.

Images Fn and Fn+1 may indicate the RGB images at time points n and n+1 in the input image sequence. For example, the image-layering circuits 221A-221B, 212A-212B, and 213A-213B may use different image-segmentation algorithms to divide images Fn and Fn+1 respectively into an image layer and a subtitle layer. Each combination of the image-layering circuits 221A-221B, 212A-212B, and 213A-213B can be regarded as a single image-layering circuit.

In an embodiment, the image-layering circuit 211A and 211B may separate the input image (e.g., an RGB image) into a subtitle layer and an image layer using a fixed brightness-layering method. For example, the image-layering circuits 211A and 211B may perform RGB to YUV conversion on each pixel of the input image to obtain a grey-scale image, wherein the grey-scale value of each pixel in the grey-scale image can be calculated using equation (1):

$$Y=0.30R+0.59G+0.11B \qquad (1)$$

wherein R, G, and B indicate the brightness value of the red, green, and blue sub-pixels of each pixel in the input image. If the brightness values of the red, green, and blue sub-pixels are between 0 and 255, the grey-scale value Y is also between 0 and 255. The image-layering circuit 211A and 211B may set a brightness-threshold ratio (e.g., between 0 and 1) to filter out the subtitle layer from the input image, wherein the bright-threshold ratio is an adjustable parameter. For example, if the brightness-threshold ratio is 0.95, the image-layering circuit 211A and 211B may calculate the corresponding brightness threshold is 255*0.95, which is approximately equal to 242. Accordingly, the image-layering circuits 211A and 211B may label the pixels in the grey-scale image having grey-scale values greater than or equal to the brightness threshold as the corresponding pixels of the subtitle layer, and label the pixels in the grey-scale image having grey-scale values less than the brightness threshold as the corresponding pixels of the image layer. Accordingly, the image-layering circuits 211A and 211B can separate the subtitle layer and the image layer in the input image according to the labeled pixels in the grey-scale image.

Figure 4:
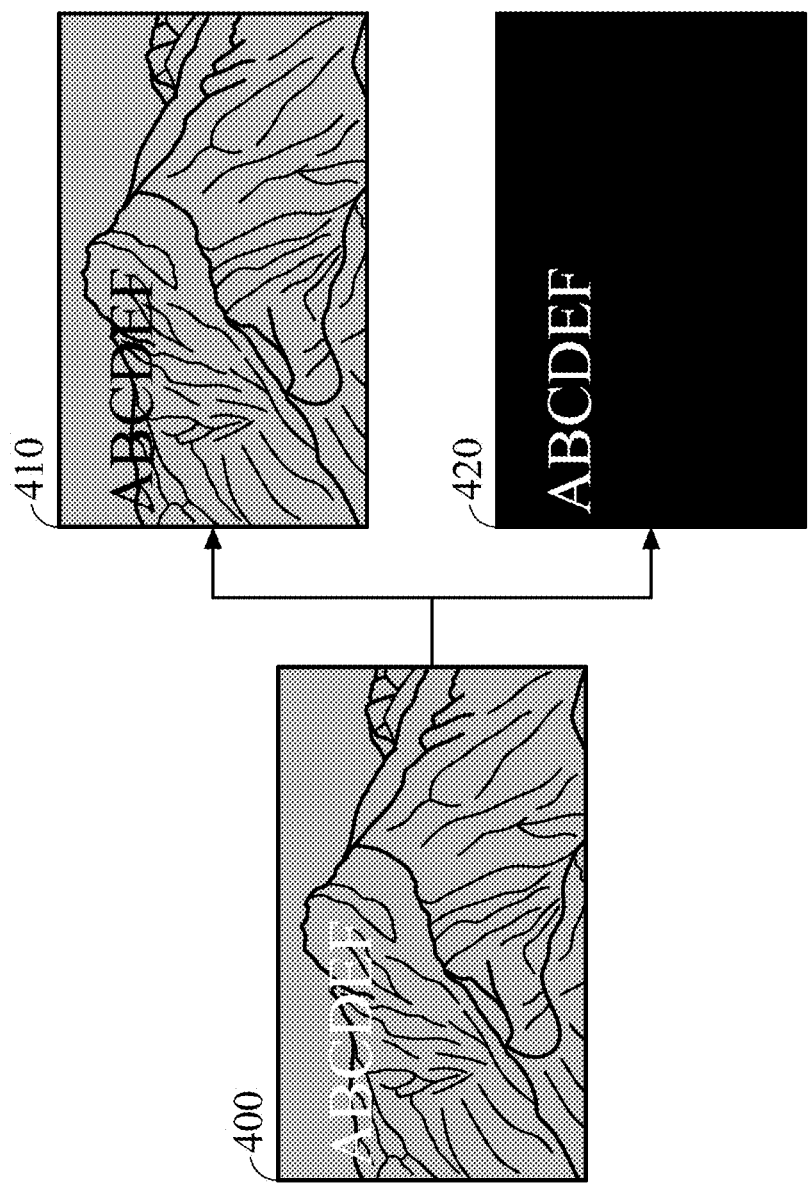
FIG. 4 is a diagram of dividing an image into an image layer and a subtitle layer in accordance with an embodiment of the invention.

For example, image Fn passes through the image-layering circuit 211A to obtain the subtitle layer Fn_L1T and the image layer Fn_L1V, and the image Fn+1 passes through the image-layering circuit 211B to obtain the subtitle layer Fn+1_L1T and the image layer Fn+1_L1V. The image 400 shown in FIG. 4 is a diagram of the image Fn, and the image 400 passes through the image-layering circuit 211A to obtain the images 410 and 420, wherein the images 410 and 420 are the subtitle layer Fn_L1T and image layer Fn_L1V. It should be noted that the image portion other than the subtitle layer Fn_L1T in image 410 is all black (i.e., brightness value =0), and the pixels in image 420 corresponding to the subtitle layer Fn_L1T are all black.

In an embodiment, the image-layering circuits 212A and 212B may separate the input image (e.g., an RGB image) into a subtitle layer and an image layer using a dynamic brightness-layering method. For example, the image-layering circuits 212A and 212B may perform RGB to YUV conversion on each pixel of the input image to obtain a grey-scale image using equation (1). Afterwards, the image-layering circuits 212A and 212B may calculate statistics on the grey-scale image to obtain a histogram 300 of the grey-scale image, as shown in FIG. 3A.

Figure 3:
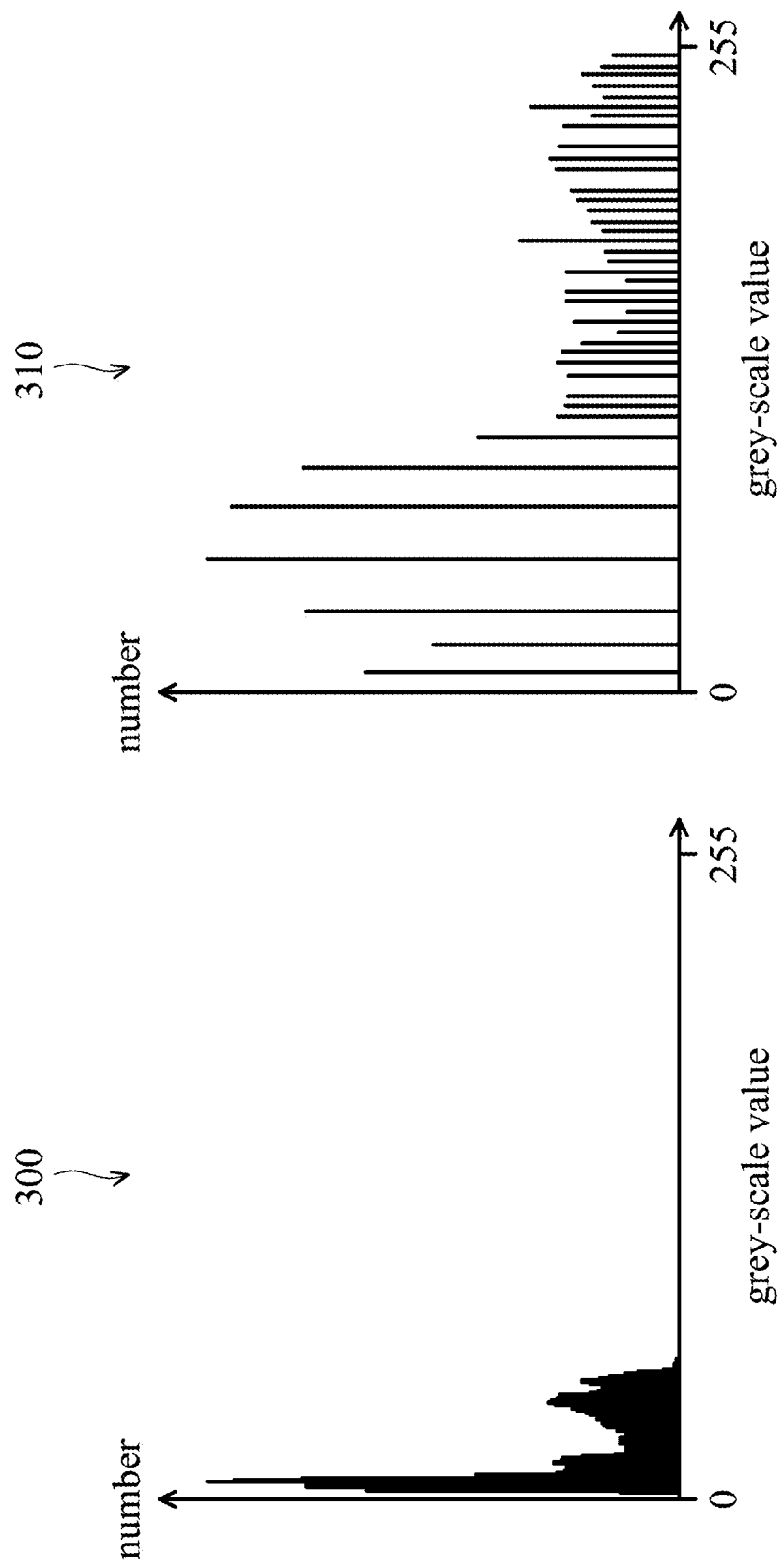
FIG. 3A is a diagram of a histogram of a grey-scale image in accordance with an embodiment of the invention.
FIG. 3B is a diagram of an equalized histogram of the grey-scale image in accordance with the embodiment of FIG. 3A.

The image-layering circuits 212A and 212B may perform equalization on the histogram 300 to obtain an equalized histogram 310, as shown in FIG. 3B. Assuming that the grey-scale value is between 0 and 255, if the statistical values in the histogram 300 are more concentrated in a certain area (e.g., high brightness, low brightness, or intermediate brightness), after equalization processing, the statistical values in the equalized histogram 310 can be more evenly distributed between 0 and 255.

The image-layering circuits 212A and 212B may set a first filtering-threshold ratio to use the equalized histogram 310 to separate the input image into the subtitle layer and image layer, wherein the first filtering-threshold ratio is an adjustable parameter. For example, assuming that the first filtering-threshold ratio is 0.95, the image-layering circuits 212A and 212B will label the pixels greater than or equal to the first filtering-threshold ratio in the equalized histogram 310 as the subtitle layer, and label the pixels less than the first filtering-threshold ratio in the equalized histogram 310 as the image layer. That is, the image-layering circuits 212A and 212B will label the first 5% of the pixels in the equalized histogram 310 as the subtitle layer, and label the pixels within 95% of the equalized histogram 310 as the image layer. Accordingly, the image-layering circuits 212A and 212B can separate the input image into the subtitle layer and image layer according to the subtitle-layer labels and image-layer labels of the pixels in the grey-scale image.

In other words, the image Fn passes through the image-layering circuit 212A to obtain the subtitle layer Fn_L2T and the image layer Fn_L2V, and the image Fn+1 passes through the image-layering circuit 212B to obtain the subtitle layer Fn+1_L2T and the image layer Fn+1_L2V. It should be noted that the image-layering circuits 212A and 212B use the first filtering-threshold ratio to layer the pixels in the equalized histogram 310. No matter whether the overall brightness of the grey-scale image is brighter or darker, both the image-layering circuits 212A and 212B can filter out relatively bright pixels and label them as the subtitle layer, and label the relatively dark pixels as the image layer.

In an embodiment, the image-layering circuits 213A and 213B may separate the input image (e.g., an RGB image) into a subtitle layer and an image layer using a block-contrast-layering method. For example, the image-layering circuits 213A and 213B may perform RGB to YUV conversion on each pixel of the input image to obtain a grey-scale image using equation (1). Afterwards, the image-layering circuits 213A and 213B may divide the grey-scale image into N*N blocks, and calculate histogram statistics on each block, where N is an adjustable parameter (e.g., a positive integer greater than or equal to 2) such as 50, 100, etc., but the invention is not limited thereto.

The image-layering circuits 213A and 213B may perform equalization on the histogram corresponding to each block to obtain the equalized histogram corresponding to each block. Assuming that the grey-scale value is between 0 and 255, if the statistical values in the histogram corresponding to each block are more concentrated in a certain area (e.g., high brightness, low brightness, or intermediate brightness), after equalization processing, the statistical values in the equalized histogram corresponding to each block can be more evenly distributed between 0 and 255.

The image-layering circuits 213A and 213B may set a second filtering-threshold ratio to use the equalized histogram corresponding to each block to separate the input image into the subtitle layer and the image layer, wherein the second filtering-threshold ratio is an adjustable parameter. For example, assuming that the second filtering-threshold ratio is 0.8, the image-layering circuits 213A and 213B may label the pixels greater than or equal to the second filtering-threshold ratio in the equalized histogram corresponding to each block as the subtitle layer, and label the pixels less than the second filtering-threshold ratio in the equalized histogram corresponding to each block as the image layer. That is, the image-layering circuits 213A and 213B may label the top 20% pixels in the equalized histogram corresponding to each block as the subtitle layer, and label the pixels within 80% of the equalized histogram corresponding to each block as the image layer. Accordingly, the image-layering circuits 213A and 213B can separate the input image into the subtitle layer and the image layer according to the subtitle-layer labels and image-layer labels of the pixels in each block.

In other words, the image Fn passes through the image-layering circuit 213A to obtain the subtitle layer Fn_L3T and the image layer Fn_L3V, and the image Fn+1 passes through the image-layering circuit 213B to obtain the subtitle layer Fn+1_L3T and the image layer Fn+1_L3V.

It should be noted that the number of image-layering circuits is not limited to 3 types (e.g., may be 3 or more types), and the layers obtained by separating images Fn and Fn+1 are also not limited to the image layer and subtitle layer, which depends on the image-segmentation algorithm actually used by each image-layering circuit. In addition, subtitles usually use relatively high-brightness text. Therefore, the image-layering circuits 211A-211B, 212A-212B, and 213A-213B can use this feature to separate the respective image layers and subtitle layers from the images Fn and Fn+1.

In an embodiment, the inputs of the motion-estimation circuits 220A-220C may include the image-layers and subtitle layers obtained by separating the images Fn and Fn+1. For example, the input of the motion-estimation circuit 220A may include the subtitle layer Fn_L1T and image layer Fn_L1V generated by the image-layering circuit 211A, and include the subtitle layer Fn+1_L1T and image layer Fn+1_L1V generated by the image-layering circuit 211B. The motion-estimation circuit 220A may perform motion estimation on the subtitle layers Fn_L1T and Fn+1_L1T, and perform motion estimation on the image layers Fn_L1V and Fn+1_L1V.

Before performing motion estimation on the subtitle layers and image layers, the motion-estimation circuits 220A-220C may include frame-rate detection circuits 221A-221C to detect the original frame rate of content in the input video signal. For example, the video-image-interpolation apparatus 100 may receive the input video signal from a host (not shown) via the transmission interface 140. If the transmission interface 140 is the HDMI interface, the input frame rate of the input video signal is generally at 60 Hz. However, the host may perform frame interpolation on a certain movie film (i.e., having an original frame rate at 24 Hz) to meet the frame rate of 60 Hz. For example, the host may perform the frame interpolation for the 24 Hz movie film through a 3:2 repeated-frame method to convert a movie film at 24 Hz into a video signal at 60 Hz.

Although the video-image-interpolation apparatus 100 can know the input frame rate of the input video signal, the video-image-interpolation apparatus 100 cannot directly know the original frame rate of the content of the input video signal. When the video-image-interpolation apparatus 100 is used to generate an output video signal at a display frame rate higher than 60 Hz, if the video-image-interpolation apparatus 100 directly uses the images of the input video signal to perform motion-compensated frame interpolation, the generated output video signal will cause obvious picture jitters. The frame-rate detection circuits 221A-221C can use the volatile memory 120 to store consecutive images of the subtitle layer and image layer to determine the original frame rate of the content of the input video signal, such as 24 Hz, 25 Hz, 30 Hz, 60 Hz, and so on, but the invention is not limited thereto. The frame-rate detection circuits 221A-221C can use known frame-rate detection technologies in the art of the present invention to obtain a reference subtitle-layer sequence and a reference image-layer sequence (i.e., the subtitle-layer sequence and image-layer sequence of the original image sequence of the content of the input video signal) from the subtitle-layer sequence and image-layer sequence generated by each image-layer circuit.

When the frame-rate detection circuit 221A has obtained the reference subtitle-layer sequence (e.g., the sequence of reference subtitle layer RFn_L1T) and the reference image-layer sequence (e.g., the sequence of reference image layer RFn_L1V), the motion-estimation circuit 220A may respectively divide the reference subtitle layer RFn_L1T and reference image layer RFn_L1V into N*N blocks, where N is an adjustable parameter (e.g., a positive integer greater than or equal to 2), such as 50, 100, etc., but the invention is not limited thereto.

In an embodiment, the motion-estimation circuits 220A-220C may perform motion estimation using the block-matching algorithm. For example, the motion-estimation circuit 220A compares the each block in the reference image layer RFn_L1V with each co-located block in the reference image layer RFn+1_L1V with rotation and offset of the surrounding n pixels. For example, the motion-estimation circuit 220A may rotate and move each block in the reference image layer RFn_L1V by plus or minus 15 degrees to find the corresponding block with the smallest difference in position and angle in the reference image layer RFn+1_L1V to calculate a first motion vector corresponding to each block in the reference image layer RFn_L1V, wherein the aforementioned difference can be calculated using mean absolute difference (MAD) or mean squared error (MSE), but the invention is not limited thereto.

In other words, the motion-estimation circuit 220A can subtract the position of the corresponding co-located block in the reference image layer RFn+1_L1V by the position of each block in the reference image layer RFn_L1V to obtain the first motion vector of each block in the reference image layer RFn_L1V. The motion-estimation circuit 220A can calculate the second motion vector corresponding to each block in the reference subtitle layer RFn_L1T in a similar manner.

Similarly, the motion-estimation circuit 220B can calculate the motion vector corresponding to each block in the reference image layer RFn_L2V and reference subtitle layer RFn_L2T. The motion-estimation circuit 220B can calculate the motion vector corresponding to each block in the reference image layer RFn_L3V and reference subtitle layer RFn_L3T.

The motion-estimation-filtering circuit 230 may be used to determine which of the motion-estimation circuits 220A, 220B, and 220C has the most accurate motion-estimation result, and may use the most accurate motion-estimation result (e.g., least motion error) as the motion-estimation result for the subsequent motion-compensated frame interpolation process. For example, when the motion-estimation circuit 220A has calculated the motion vector corresponding to each block in the reference image layer RFn_L1V and subtitle layer RFn_L1T, the motion-estimation-filtering circuit 230 may perform motion compensation on each block in the reference image layer RFn_L1V and subtitle layer RFn_L1T using the corresponding motion vector to obtain a first motion-compensated image layer and a first motion-compensated subtitle layer. The motion-estimation-filtering circuit 230 may subtract the first motion-compensated image layer and the first motion-compensated subtitle layer by the reference image layer RFn+1_L1V and reference subtitle layer RFn+1_L1T to obtain an image-layer difference image and a subtitle-layer difference image. The motion-estimation-filtering circuit 230 may calculate a first sum of absolute difference (SAD) of each pixel in the image-layer difference image and the subtitle-layer difference image as the first motion error.

In a similar manner, the motion-estimation-filtering circuit 230 may calculate a second motion error (i.e., for the motion-estimation circuit 220B) of each pixel in a second motion-compensated image-layer and a second motion-compensated subtitle layer, and calculate a third motion error (i.e., for the motion-estimation circuit 220C) of each pixel in a third motion-compensated image-layer and a third motion-compensated subtitle layer.

Afterwards, the motion-estimation-filtering circuit 230 may compare the first motion error, the second motion error, and the third motion error to determine the smallest motion error, and transmit the motion vector corresponding to each block in the reference image layer and reference subtitle layer having the smallest motion error to the motion-compensated frame-interpolation circuit 250 and the frame-interpolation-evaluation circuit 240.

In some embodiments, if the motion-estimation circuit 220A has the smallest motion error, the frame-interpolation-evaluation circuit 240 may determine whether there is motion difference between the reference image layers RFn_L1V and RFn+1_L1V, and determine whether there is motion difference between the reference subtitle layers RFn_L1T and RFn+1_L1T. For example, the frame-interpolation-evaluation circuit 240 may subtract reference image layer RFn+1_L1V and the reference subtitle layer RFn+1_L1T from the reference image layer Rn_L1V and reference subtitle layer RFn_L1T, respectively, and calculate the SAD of each pixel in the image-layer difference image and the subtitle-layer difference image for determination. In other words, because the reference RFn is composed of the reference subtitle layer RFn_L1T and reference image layer RFn_L1V, and the reference image RFn+1 is composed of reference subtitle layer RFn+1__L1T and the reference image layer RFn+1_L1V, the frame-interpolation-evaluation circuit 240 may determine whether there is motion difference between the reference images RFn and RFn+1. If the motion-estimation circuit 220B or 220C has the motion-estimation result having the smallest motion error, the frame-interpolation-evaluation circuit 240 may determine in a similar manner.

When the frame-interpolation-evaluation circuit 240 determines that there is motion difference (or the motion difference is greater than or equal to a predetermined value) between the reference images RFn and RFn+1, the frame-interpolation-evaluation circuit 240 may generate a motion-compensated frame-interpolation enable signal MCFI_EN at a high logic state. When the frame-interpolation-evaluation circuit 240 determines that there is no motion difference (or the motion difference is less than a predetermined value) between the reference images RFn and RFn+1, the frame-interpolation-evaluation circuit 240 may determine that motion-compensated frame interpolation is not need between the reference images RFn and RFn+1, and thus the motion-compensated frame-interpolation enable signal MCFI_EN generated by the frame-interpolation-evaluation circuit 240 is at a low logic state.

In addition, the frame-interpolation-evaluation circuit 240 may calculate the number M required by the motion-compensated frame interpolation between the reference images RFn and RFn+1 according to the original frame rate of the content of the input video signal (i.e., may be different from the input frame rate of the input video signal, original frame rate≤input frame rate) and the display frame rate of the output video signal, wherein the original frame rate and display frame rate can be represented by "iFrame_Rate" and "oFrame_Rate", respectively. The relationship between the original frame rate iFrame_Rate and the display frame rate oFrame_Rate should satisfy equation (2):

$$\text{iFrame\_Rate} \times (M+1) \leq \text{oFrame\_Rate} \tag{2}$$

Figure 5A:
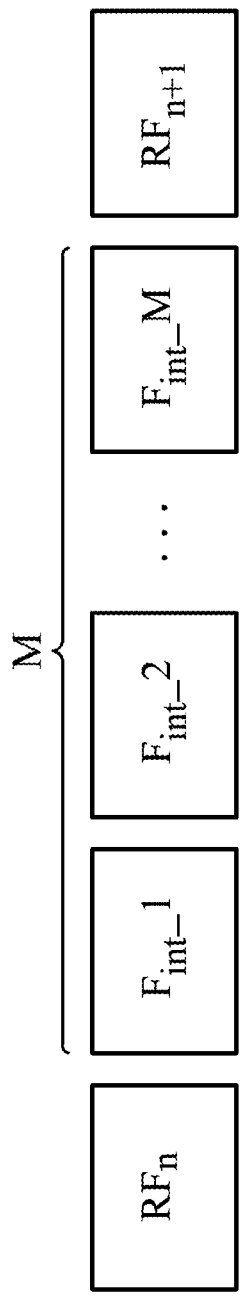
FIG. 5A is a diagram of order of images and interpolated images in accordance with an embodiment of the invention.

The frame-interpolation evaluation circuit 240 may transmit the calculated number M of images to the motion-compensated frame-interpolation circuit 250. The motion-compensated frame-interpolation circuit 250 may calculate the interpolated images Fint_1, Fint 2, . . . , Fint_M between the reference images Fn and Fn+1, as shown in FIG. 5A. For example, if the original frame rate iFrame_Rate=25 and the display frame rate oFrame_Rate=60, M is equal to 1. That is, the motion-compensated frame-interpolation circuit 250 has to calculate one interpolated images between the reference images RFn and RFn+1.

Figure 5B:
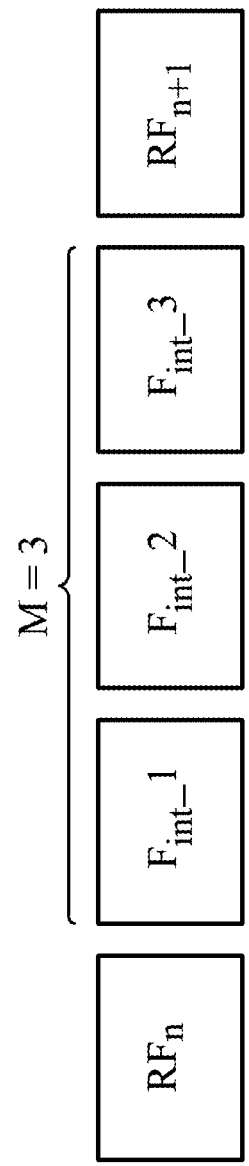
FIG. 5B is another diagram of order of images and interpolated images in accordance with an embodiment of the invention.

If the original frame rate iFrame_Rate=25 and the display frame rate oFrame_Rate=120, it indicates that the motion-compensated frame-interpolation circuit 250 has to calculate 3 interpolated images Fint_1, Fint_2, and Fint_3 between the reference images RFn and RFn+1, as shown in FIG. 5B. When the motion-compensated interpolation enable signal MCFI_EN is in the high logic state, the motion-compensated frame-interpolation circuit 250 may calculate the interpolated images Fint_1, Fint_2, and Fint_3 between the reference images RFn and RFn+1 by motion compensation. When the motion-compensated interpolation enable signal MCFI_EN is in the low logic state, it indicates that there is no motion difference between the reference images RFn and RFn_1, and thus the motion-compensated frame-interpolation circuit 250 may duplicate the reference image RFn as the interpolated images Fint_1, Fint_2, and Fint_3.

In an embodiment, when the motion-estimation-filtering circuit 230 has determined the motion vector MV for a specific block B0 from the reference image RFn to the reference image RFn+1, as shown in FIG. 5C, the motion-compensated frame-interpolation circuit 250 may calculate the motion vectors for the specific block B0 from the reference image RFn to the interpolated images Fint_1, Fint_2, and Fint_3 being 0.25 MV, 0.5 MV, and 0.75 MV, respectively. The motion vector for the specific block B0 from the reference image RFn to the interpolated image Fint_1 is shown in FIG. 5D.

In other words, if the position of the specific block B0 in the reference image RFn is RFn_B0, the position of the specific block B0 in the interpolated image Fint_1 can be expressed by equation (3):

$$\text{Fint\_1\_B0} = \text{RFn\_B0} + \frac{MV}{M+1} \tag{3}$$

Similarly, the corresponding positions of the specific block B0 in the reference image RFn in the interpolated images Fint_2 and Fint_3 can be respectively calculated using equation (4) and equation (5):

$$\text{Fint\_2\_B0} = \text{RFn\_B0} + \frac{2 \times MV}{M+1} \tag{4}$$

$$\text{Fint\_3\_B0} = \text{RFn\_B0} + \frac{3 \times MV}{M+1} \tag{5}$$

Accordingly, the corresponding position of each block in the reference image RFn in the interpolated images Fint_1, Fint_2, and Fint_3 can be calculated in a similar manner.

It should be noted that the reference images RFn and RFn+1 in the aforementioned embodiments can be replaced by the reference-image layer or the reference-subtitle layer, so they are also applicable to the motion compensation of the reference-image layer and the reference-subtitle layer, respectively. The motion-compensated frame-interpolation circuit 250 may calculate the partial interpolated images in each interpolated image corresponding to the reference-image layer and reference-subtitle layer, and superimpose the partial interpolated images to obtain a complete interpolated image.

After the motion-compensated frame-interpolation circuit 250 has calculated the interpolated images Fint_1, Fint_2, . . . , Fint M between the reference images RFn and RFn+1, the motion-compensated frame-interpolation circuit 250 may store the interpolated images Fint_1, Fint_2, . . . , Fint_M in the volatile memory 120, and determine the image output sequence in the output video signal to meet the display frame rate of the output video signal.

Specifically, after the motion-compensated frame-interpolation circuit 250 has calculated the interpolated images Fint_1, Fint_2, . . . . . , Fint_M between the reference images RFn and RFn+1, it may still not meet the number of frames per second required by the output video signal. For example, if the original frame rate iFrame_Rate=25 and the output frame rate oFrame_Rate=120, the motion-compensated frame-interpolation circuit 250 may calculate 3 interpolated images Fint_1, Fint_2, and Fint_3 between the reference images RFn and RFn+1. In other words, the input video signal has 25 images per second, but after the motion-compensated frame-interpolation circuit 250 generates the interpolated images Fint_1, Fint_2, and Fint_3, it can only reach 100 images per second, which is not enough for the frame numbers required by the output video signal. Accordingly, when the video-image-interpolation apparatus 100 generates the output video signal, the display-control circuit 260 may perform a frame-rate-conversion process to convert the input video signal into the output video signal satisfying the display frame rate.

For example, each reference image RFn in the reference image sequence has a corresponding timestamp, as shown in Table 1:

TABLE 1

| Reference image | RF0 | RF1 | RF2 | RF3 | RF4 | RF5 | RF6 | RF7 | RF8 | RF9 |
|---|---|---|---|---|---|---|---|---|---|---|
| Timestamp | RF0_t | RF1_t | RF2_t | RF3_t | RF4_t | RF5_t | RF6_t | RF7_t | RF8_t | RF9_t |
| Time (ms) | 0 | 40 | 80 | 120 | 160 | 200 | 240 | 280 | 320 | 360 |

Each of the interpolated images Fint_1 to Fint_M generated by the motion-compensated frame-interpolation circuit 250 also has a corresponding timestamp. The motion-compensated frame-interpolation circuit 250 may organize the reference images RFn in the reference image sequence and the interpolated images Fint_1 to Fint_M into a first video sequence, and assign a corresponding timestamp to each image in the first video sequence. For example, each image MFn in the first video sequence has a corresponding timestamp MFn_t. For convenience of description, if one interpolated image is added between two adjacent reference images of the reference image sequence by motion compensation, the first video sequence shown in Table 2-1 and Table 2-2 can be obtained:

TABLE 2-1

| Image | MF0 | MF1 | MF2 | MF3 | MF4 | MF5 | MF6 | MF7 | MF8 | MF9 |
|---|---|---|---|---|---|---|---|---|---|---|
| Timestamp | MF0_t | MF1_t | MF2_t | MF3_t | MF4_t | MF5_t | MF6_t | MF7_t | MF8_t | MF9_t |
| Time (ms) | 0 | 20 | 40 | 60 | 80 | 100 | 120 | 140 | 160 | 180 |

TABLE 2-2

| Image | MF10 | MF11 | MF12 | MF13 | MF14 | MF15 | MF16 | MF17 | MF18 |
|---|---|---|---|---|---|---|---|---|---|
| Timestamp | MF10_t | MF11_t | MF12_t | MF13_t | MF14_t | MF15_t | MF16_t | MF17_t | MF18_t |
| Time (ms) | 200 | 220 | 240 | 260 | 280 | 300 | 320 | 340 | 360 |

The images MF0, MF2, MF4, ..., MF18 correspond to the reference images RF0 to RF9, respectively. The images MF1, MF3, ..., MF17 are interpolated images, and their corresponding timestamps are in the middle of the timestamps of two adjacent reference images. For example, the timestamps of the reference images RF0 and RF1 (i.e., corresponding to the images MF0 and MF2) are at 0 and 40 ms, respectively. The timestamp of the interpolated image (i.e., corresponding to the image MF1) between the reference images RF0 and RF1 is in the middle of 0 and 40 ms, that is, 20 ms.

In addition, each output image OFn in the output video sequence also has a corresponding timestamp OFn_t. For convenience of description, assuming that the display frame rate is 18 ms between every two consecutive frames, the output video sequence shown in Table 3-1 and Table 3-2 can be obtained.

TABLE 3-1

| Output Image | OF0 | OF1 | OF2 | OF3 | OF4 | OF5 | OF6 | OF7 | OF8 | OF9 | OF10 |
|---|---|---|---|---|---|---|---|---|---|---|---|
| Timestamp | OF0_t | OF1_t | OF2_t | OF3_t | OF4_t | OF5_t | OF6_t | OF7_t | OF8_t | OF9_t | OF10_t |
| time (ms) | 0 | 18 | 36 | 54 | 72 | 90 | 108 | 126 | 144 | 162 | 180 |

TABLE 3-2

| Output Image | OF11 | OF12 | OF13 | OF14 | OF15 | OF16 | OF17 | OF18 | OF19 | OF20 |
|---|---|---|---|---|---|---|---|---|---|---|
| timestamp | OF11_t | OF12_t | OF13_t | OF14_t | OF15_t | OF16_t | OF17_t | OF18_t | OF19_t | OF20_t |
| time (ms) | 198 | 216 | 234 | 252 | 270 | 288 | 306 | 324 | 342 | 360 |

The display-control circuit 260 may perform frame rate conversion according to equation (6):

$$\begin{cases} \text{if } OFn\_t < MFm\_t, & OFn = MF_{m-1} \\ \text{if } OFn\_t \geq MFm\_t, & OFn = MF_m \end{cases} \quad (6)$$

where MFm_t denotes the timestamp that is closest to the output image OFn.

For example, the images MF_0 to MF19 of the first video sequence are all stored in the volatile memory 120. When the playback control circuit 260 is about to generate the output image OF3, because the timestamp OF3_t of the output image OF3 corresponds to 54 ms, the display-control circuit 260 may determine that the image MF3 is closest to the output image OF3, and the timestamp OF3_t is earlier than the timestamp MF3_t of the image MF3, the display-control circuit 260 may select the image MF2 as the output image OF3. When the display-control circuit 260 is about to generate the output image OF10, because the timestamp OF10_t of the output image OF10 corresponds to 180 ms, the display-control circuit 260 may determine that the image MF9 is closest to the output image OF10 and the timestamp OF10_t is the same as the timestamp MF9_t, the display-control circuit 260 may select the image MF9 as the output image OF10. When the display-control circuit 260 is about to generate the output image OF16, because the timestamp OF16_t of the output image OF16 corresponds to 288 ms, the display-control circuit 260 may determine that the image MF14 is closest to the output image OF16 and the timestamp OF16_t is later than the timestamp MF14_t of the image MF14, the display-control circuit 260 may select the image MF14 as the output image OF16. Accordingly, the display-control circuit 260 may obtain each output image of the output video sequence in a similar manner.

Figure 6A:
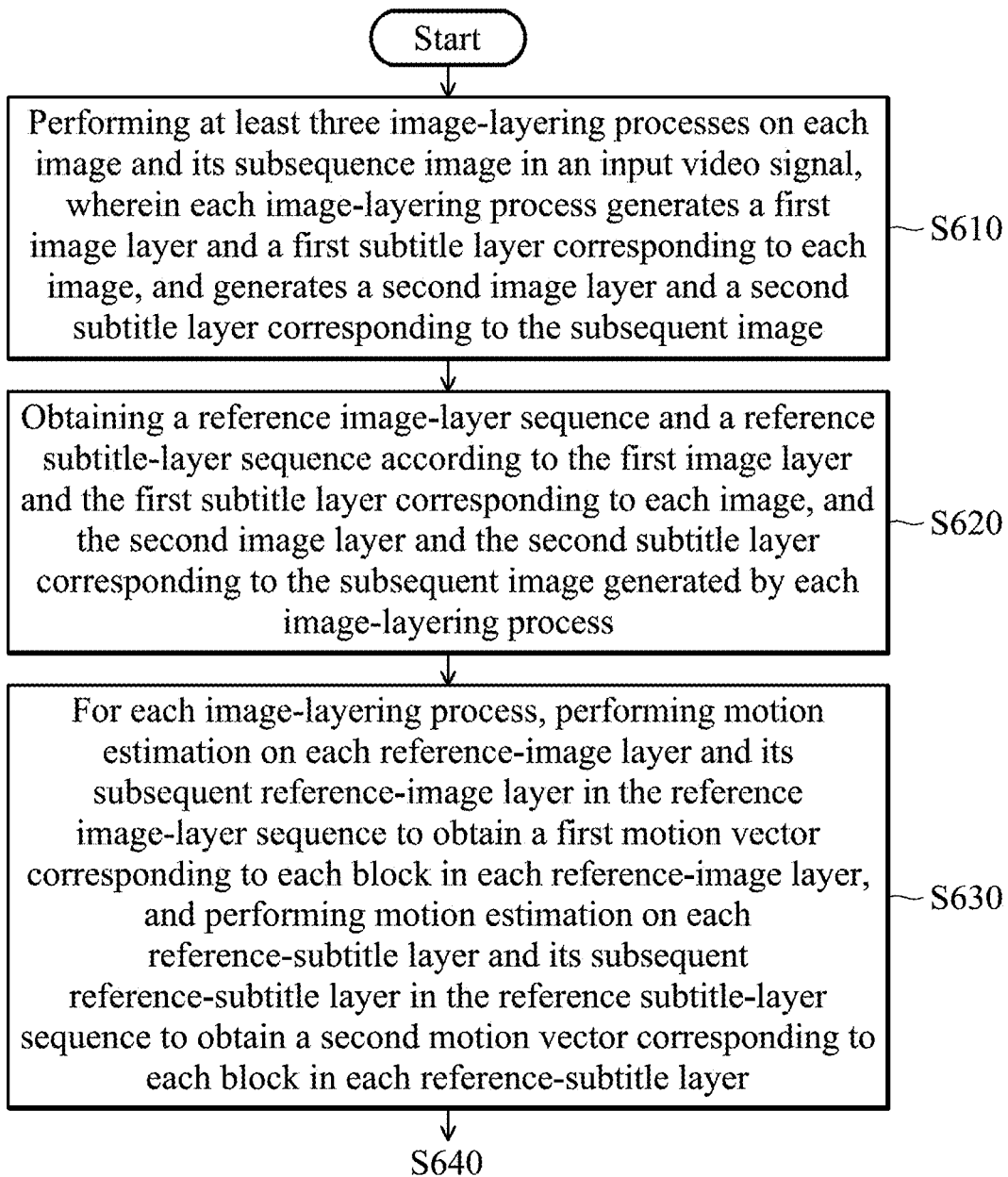
FIGS. 6A-6B are portions of a flow chart of a method of adaptive motion-compensated frame interpolation in accordance with an embodiment of the invention.
Figure 6B:
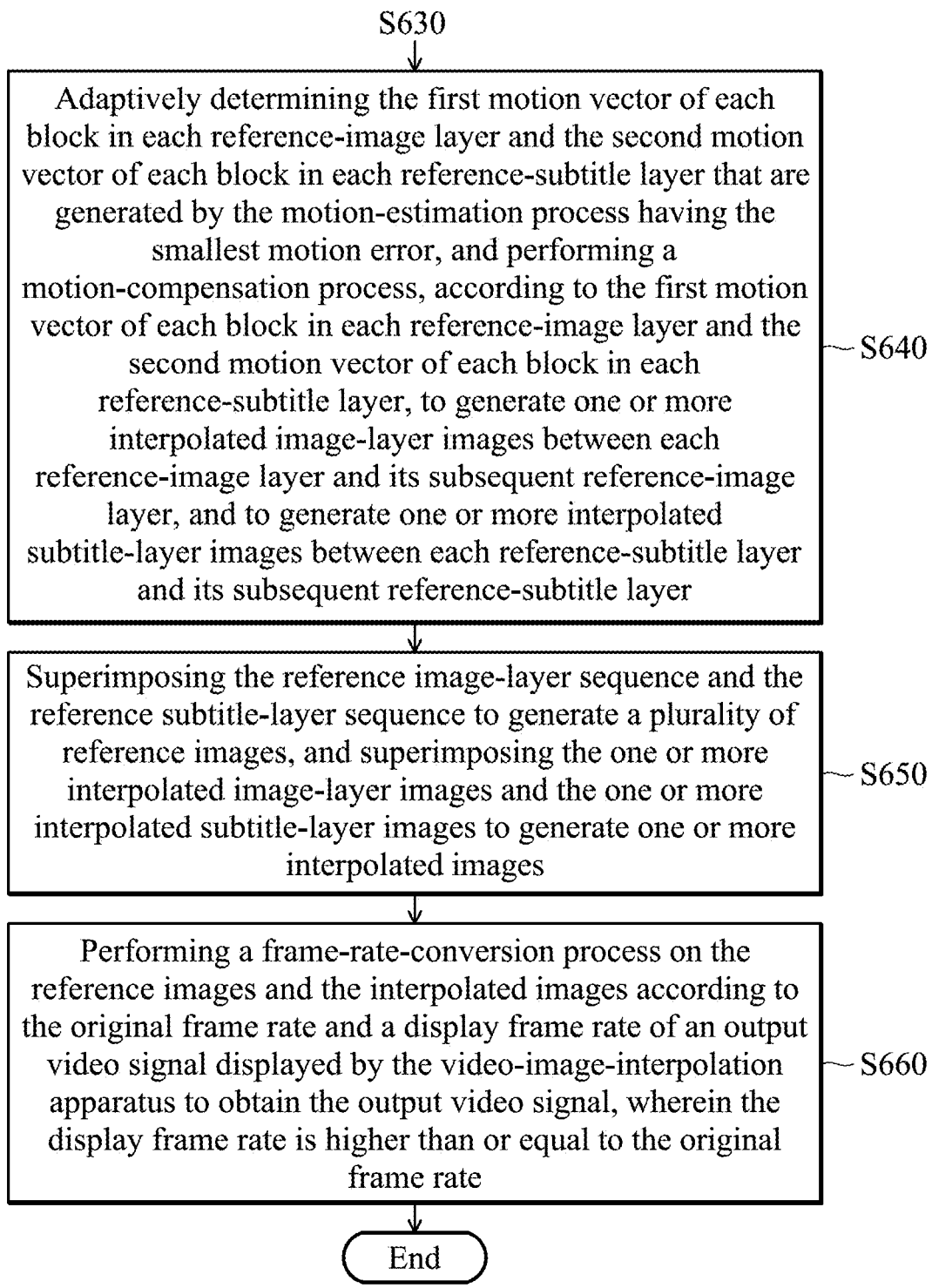

FIG. 6A-6B are portions of a flow chart of a method of adaptive motion-compensated frame interpolation in accordance with an embodiment of the invention. Please refer to FIG. 2 and FIG. 6A-6B.

In step S610, at least three image-layering processes are performed on each image and its subsequent image in an input video signal, wherein each image-layering process generates a first image layer and a first subtitle layer corresponding to each image, and generates a second image layer and a second subtitle layer corresponding to the subsequent image. For example, the image-layering circuits 211A-211B, 212A-212B, and 213A-213B may separate each image and its corresponding subsequent image in the input video signal respectively using a fixed-brightness-layering method, a dynamic-brightness-layering method, and a block-contrast-layering method to generate the first image layer and first subtitle layer corresponding to each image, and to generate the second image layer and second subtitle layer corresponding to the subsequent image.

In step S620, a reference image-layer sequence and a reference subtitle-layer sequence are obtained according to the first image layer and the first subtitle layer corresponding to each image, and the second image layer and the second subtitle layer corresponding to the subsequent image generated by each image-layering process, wherein the reference image-layer sequence and the reference subtitle-layer sequence has an original frame rate. For example, the frame-rate detection circuits 221A-221C can use known frame-rate detection technologies in the art of the present invention to obtain the reference subtitle-layer sequence and the reference image-layer sequence (i.e., the subtitle-layer sequence and image-layer sequence of the original image sequence of the content of the input video signal) from the subtitle-layer sequence and image-layer sequence generated by each image-layer circuit.

In step S630, motion estimation is performed on each reference-image layer and its subsequent reference-image layer in the reference image-layer sequence to obtain a first motion vector corresponding to each block in each reference-image layer, and motion estimation is performed on each reference-subtitle layer and its subsequent reference-subtitle layer in the reference subtitle-layer sequence to obtain a second motion vector corresponding to each block in each reference-subtitle layer. For example, the motion-estimation circuit 220A may rotate and move each block in the reference image layer RFn_L1V by plus or minus 15 degrees to find the corresponding block with the smallest difference in position and angle in the reference image layer RFn+1_L1V to calculate a first motion vector corresponding to each block in the reference image layer RFn_L1V. The motion-estimation circuit 220A can calculate the second motion vector corresponding to each block in the reference subtitle layer RFn_L1T in a similar manner. The motion-estimation circuits 220B and 220C can calculate the first motion vector of each block in the reference-image layer and the second motion vector of each block in the reference-subtitle layer in a similar manner.

In step S640, the first motion vector of each block in each reference-image layer and the second motion vector of each block in each reference-subtitle layer, that are generated by the motion estimation having the smallest motion error, are adaptively determined and are used to perform a motion-compensation process to generate one or more interpolated image-layer images between each reference-image layer and its subsequent reference-image layer, and to generate one or more interpolated subtitle-layer images between each reference-subtitle layer and its subsequent reference-subtitle layer. For example, the motion-estimation-filtering circuit 230 may compare the first motion error, the second motion error, and the third motion error to determine the smallest motion error, and transmit the motion vector corresponding to each block in the reference image layer and reference subtitle layer having the smallest motion error to the motion-compensated frame-interpolation circuit 242 and the frame-interpolation-evaluation circuit 240. In addition, the motion-compensated frame-interpolation circuit 250 may perform motion compensation respectively on the reference-image layer and the reference-subtitle layer to generate one or more interpolated image-layer images between each reference-image layer and its subsequent reference-image layer, and to generate one or more interpolated subtitle-layer images between each reference-subtitle layer and its subsequent reference-subtitle layer.

In step S650, the reference image-layer sequence and the reference subtitle-layer sequence are superimposed to generate a plurality of reference images, and the one or more interpolated image-layer images and the one or more interpolated subtitle-layer images are superimposed to generate one or more interpolated images. For example, each reference image in the reference-image sequence is composed of the corresponding reference-image layer and reference-subtitle layer, and each interpolated image is composed of the corresponding interpolated image-layer image and interpolated subtitle-layer image. Thus, the motion-compensated frame-interpolation circuit 250 may superimpose the reference image-layer sequence and the reference subtitle-layer sequence to generate a plurality of reference images, and superimpose the one or more interpolated image-layer images and the one or more interpolated subtitle-layer images to generate one or more interpolated images.

In step S660, a frame-rate-conversion process is performed on the reference images and the interpolated images according to the original frame rate and a display frame rate of an output video signal displayed by the video-image-interpolation apparatus to obtain the output video signal. For example, after the motion-compensated frame-interpolation circuit 250 has calculated the interpolated images Fint_1, Fint_2, . . . , Fint_M between the reference images RFn and RFn+1, it may still not meet the number of frames per second required by the output video signal, and thus the display-control circuit 260 may perform the frame-rate-conversion process using equation (6) to satisfy the display frame rate of the output video signal.

In view of the above, a video-image-interpolation apparatus and a method of adaptive motion-compensated frame interpolation are provided, which are capable of separating each image in the input video signal into a subtitle layer and an image layer using different image-layering methods, and adaptively select the motion estimation result having the least motion error for motion compensation, thereby improving the image quality of the output video signal generated by motion-compensated frame interpolation.

Words such as "first", "second", and "third" are used in the scope of patent application to modify the elements in the scope of patent application, and are not used to indicate that there is an order of priority and antecedent relationship between them. , Either one element precedes another element, or the chronological order when executing method steps, only used to distinguish elements with the same name.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A video-image-interpolation apparatus, comprising:
at least three image-layering circuits, each image-layering circuit performing a corresponding image-layering process on each image and its subsequent image in an input video signal to generate a first image layer and a first subtitle layer corresponding to each image and to generate a second image layer and a second subtitle layer corresponding to the subsequent image;
at least three motion-estimation circuits, each motion-estimation circuit obtaining a reference image-layer sequence and a reference subtitle-layer sequence according to the first image layer and the first subtitle layer corresponding to each image, and obtaining the second image layer and the second subtitle layer corresponding to the subsequent image generated by each image-layering process, wherein the reference image-layer sequence and the reference subtitle-layer sequence has an original frame rate,
wherein each motion-estimation circuit performs motion estimation on each reference-image layer and its subsequent reference-image layer in the reference image-layer sequence to obtain a first motion vector corresponding to each block in each reference-image layer, and performs motion estimation on each reference-subtitle layer and its subsequent reference-subtitle layer in the reference subtitle-layer sequence to obtain a second motion vector corresponding to each block in each reference-subtitle layer;
a motion-estimation-filtering circuit, adaptively determining the first motion vector of each block in each reference-image layer and the second motion vector of each block in each reference-subtitle layer, that are generated by the motion-estimation circuit having the smallest motion error;
a motion-compensated frame-interpolation circuit, performing a motion-compensation process, according to the first motion vector of each block in each reference-image layer and the second motion vector of each block in each reference-subtitle layer, to generate one or more interpolated image-layer images between each reference-image layer and its subsequent reference-image layer, and to generate one or more interpolated subtitle-layer images between each reference-subtitle layer and its subsequent reference-subtitle layer,
wherein the motion-compensated frame-interpolation circuit superimposes the reference image-layer sequence and the reference subtitle-layer sequence to generate a plurality of reference images, and superimposes the one or more interpolated image-layer images and the one or more interpolated subtitle-layer images to generate one or more interpolated images; and
a display-control circuit, performing a frame-rate-conversion process on the reference images and the interpolated images according to the original frame rate and a display frame rate of an output video signal displayed by the video-image-interpolation apparatus to obtain the output video signal, wherein the display frame rate is higher than or equal to the original frame rate.

2. The video-image-interpolation apparatus as claimed in claim 1, wherein the at least three image-layering circuits comprise a first image-layering circuit, a second image-layering circuit, and a third image-layering circuit, wherein the first image-layering circuit, the second image-layering circuit, and the third image-layering circuit respectively perform image layering on each image and its subsequent image in the input video signal using fixed-brightness layering, dynamic-brightness layering, and block-contrast layering to generate the first image layer and the first subtitle layer corresponding to each image, and to generate the second image layer and the second subtitle layer corresponding to the subsequent image.

3. The video-image-interpolation apparatus as claimed in claim 2, wherein the first image-layering circuit converts each image of the input video signal into a grey-scale image,
wherein the first image-layering circuit labels pixels in the grey-scale image having grey-scale values greater than or equal to a brightness threshold as the first subtitle layer, and labels other pixels in the grey-scale image having grey-scale values less than the brightness threshold as the first image layer.

4. The video-image-interpolation apparatus as claimed in claim 2, wherein the second image-layering circuit converts each image of the input video signal into a grey-scale image, and calculates statistics of the grey-scale image to obtain a histogram of the grey-scale image,
wherein the second image-layering circuit performs equalization on the histogram to obtain an equalized histogram, and labels pixels greater than or equal to a first filtering-threshold ratio in the equalized histogram as the first subtitle layer, and labels pixels less than the first filtering-threshold ratio in the equalized histogram as the first image layer.

5. The video-image-interpolation apparatus as claimed in claim 2, wherein the third image-layering circuit converts each image of the input video signal into a grey-scale image, divides the grey-scale image into N*N blocks, and calculates statistics of each block to obtain a histogram corresponding to each block, where N is a positive integer greater than or equal to 2,
wherein the third image-layering circuit further performs equalization on the histogram corresponding to each block to obtain an equalized histogram corresponding to each block, and labels pixels greater than or equal to a second filtering-threshold ratio in the equalized histogram corresponding to each block as the first subtitle layer, and labels pixels less than the second filtering-threshold ratio in the equalized histogram corresponding to each block as the first image layer.

6. The video-image-interpolation apparatus as claimed in claim 1, wherein the motion-estimation-filtering circuit performs motion compensation on each block in the reference-image layer and the reference-subtitle layer according to the first motion vector corresponding to each block in the reference-image layer and the second motion vector corresponding to each block in the reference-subtitle layer generated by each motion-estimation circuit to obtain a first motion-compensated image layer and a first motion-compensated subtitle layer, and subtracts the subsequent reference-image layer and the subsequent reference-subtitle layer respectively from the first motion-compensated image layer and first motion-compensated subtitle layer to obtain an image-layer difference image and a subtitle-layer difference image, and calculates a sum of absolute difference (SAD) for each pixel in the image-layer difference image and the subtitle-layer difference image as a motion error corresponding to each motion-estimation circuit,
wherein the motion-estimation-filtering circuit compares the motion error corresponding to each motion-estimation circuit to determine the motion-estimation circuit having the smallest motion error.

7. The video-image-interpolation apparatus as claimed in claim 1, further comprising: a frame-interpolation-evaluation circuit for determining whether there is motion difference between each reference image and its subsequent reference image,
wherein in response to the frame-interpolation-evaluation circuit determining that there is motion difference between each reference image and its subsequent reference image, the frame-interpolation-evaluation circuit generates a motion-compensated-frame-interpolation enable signal at a high-logic state,
wherein in response to the frame-interpolation-evaluation circuit determining that there is no motion difference between each reference image and its subsequent reference image, the frame-interpolation-evaluation circuit generates the motion-compensated-frame-interpolation enable signal at a high-logic state.

8. The video-image-interpolation apparatus as claimed in claim 7, wherein the frame-interpolation-evaluation circuit calculates a number M of images required for frame interpolation between each reference image and its subsequent reference image according to the original frame rate and the display frame rate, where M is natural number,
wherein in response to the motion-compensated frame-interpolation enable signal being in the high-logic state, the motion-compensated frame-interpolation circuit performs motion compensation to generate M interpolated image-layer images between each reference-image layer and its subsequent reference-image layer, and to generate M interpolated subtitle-layer images between each reference-subtitle layer and its subsequent reference-subtitle layer,
wherein in response to the motion-compensated frame-interpolation enable signal being in the low-logic state, the motion-compensated frame-interpolation circuit performs motion compensation to generate M interpolated subtitle-layer images between each reference-subtitle layer and its subsequent reference-subtitle layer.

9. The video-image-interpolation apparatus as claimed in claim 8, wherein the motion-compensated frame-interpolation circuit organizes the reference images and the interpolated images into a first video sequence, and assigns a corresponding first timestamp to each image in the first video sequence, and the display-control circuit assigns a corresponding second timestamp to each output image.

10. The video-image-interpolation apparatus as claimed in claim 9, wherein the display-control circuit compares the second timestamp of each output image and the first timestamp of a specific image in the first video sequence that is closest to
wherein when the second timestamp is earlier than the first timestamp, the display-control circuit selects a previous image of the specific image as the output image,
wherein when the second timestamp is later than or equal to the first timestamp, the display-control circuit selects the specific image as the output image.

11. A method of adaptive motion-compensated frame interpolation comprising:
performing at least three image-layering processes on each image and its subsequent image in an input video signal, wherein each image-layering process generates a first image layer and a first subtitle layer corresponding to each image, and generates a second image layer and a second subtitle layer corresponding to the subsequent image;
obtaining a reference image-layer sequence and a reference subtitle-layer sequence according to the first image layer and the first subtitle layer corresponding to each image and the second image layer and the second subtitle layer corresponding to the subsequent image generated by each image-layering process, wherein the reference image-layer sequence and the reference subtitle-layer sequence has an original frame rate;
for each image-layering process, performing motion estimation on each reference-image layer and its subsequent reference-image layer in the reference image-layer sequence to obtain a first motion vector corresponding to each block in each reference-image layer, and performing motion estimation on each reference-subtitle layer and its subsequent reference-subtitle layer in the reference subtitle-layer sequence to obtain a second motion vector corresponding to each block in each reference-subtitle layer;
adaptively determining the first motion vector of each block in each reference-image layer and the second motion vector of each block in each reference-subtitle layer that are generated by the motion-estimation process having the smallest motion error;
performing a motion-compensation process, according to the first motion vector of each block in each reference-image layer and the second motion vector of each block in each reference-subtitle layer, to generate one or more interpolated image-layer images between each reference-image layer and its subsequent reference-image layer, and to generate one or more interpolated subtitle-layer images between each reference-subtitle layer and its subsequent reference-subtitle layer;
superimposing the reference image-layer sequence and the reference subtitle-layer sequence to generate a plurality of reference images, and superimposing the one or more interpolated image-layer images and the one or more interpolated subtitle-layer images to generate one or more interpolated images; and
performing a frame-rate-conversion process on the reference images and the interpolated images according to the original frame rate and a display frame rate of an output video signal displayed by the video-image-interpolation apparatus to obtain the output video signal, wherein the display frame rate is higher than or equal to the original frame rate.

12. The method as claimed in claim 11, wherein the at least three image-layering processes comprises a first image-layering process, a second image-layering process, and a third image-layering process, wherein the first image-layering process, the second image-layering process, and the third image-layering process respectively perform image layering on each image and its subsequent image in the input video signal using fixed-brightness layering, dynamic-brightness layering, and block-contrast layering to generate the first image layer and the first subtitle layer corresponding to each image, and to generate the second image layer and the second subtitle layer corresponding to the subsequent image.

13. The method as claimed in claim 12, wherein the first image-layering process comprises:
converting each image of the input video signal into a grey-scale image;
labeling pixels in the grey-scale image having grey-scale values greater than or equal to a brightness threshold as the first subtitle layer; and labeling other pixels in the grey-scale image having grey-scale values less than the brightness threshold as the first image layer.

14. The method as claimed in claim 12, wherein the second image-layering process comprises:
converting each image of the input video signal into a grey-scale image;
calculating statistics of the grey-scale image to obtain a histogram of the grey-scale image;
performing equalization on the histogram to obtain an equalized histogram;
labeling pixels greater than or equal to a first filtering-threshold ratio in the equalized histogram as the first subtitle layer; and
labeling pixels less than the first filtering-threshold ratio in the equalized histogram as the first image layer.

15. The method as claimed in claim 12, wherein the second image-layering process comprises:
converting each image of the input video signal into a grey-scale image, and dividing the grey-scale image into N*N blocks;
calculating statistics of each block to obtain a histogram corresponding to each block, where N is a positive integer greater than or equal to 2;
performing equalization on the histogram corresponding to each block to obtain an equalized histogram corresponding to each block;
labeling pixels greater than or equal to a second filtering-threshold ratio in the equalized histogram corresponding to each block as the first subtitle layer; and
labeling pixels less than the second filtering-threshold ratio in the equalized histogram corresponding to each block as the first image layer.

16. The method as claimed in claim 11, wherein the step of adaptively determining the first motion vector of each block in each reference-image layer and the second motion vector of each block in each reference-subtitle layer that are generated by the motion-estimation process having the smallest motion error comprises:
performing motion compensation on each block in the reference-image layer and the reference-subtitle layer according to the first motion vector corresponding to each block in the reference-image layer and the second motion vector corresponding to each block in the reference-subtitle layer generated by each motion estimation to obtain a first motion-compensated image layer and a first motion-compensated subtitle layer;
subtracting the subsequent reference-image layer and the subsequent reference-subtitle layer respectively from the first motion-compensated image layer and first motion-compensated subtitle layer to obtain an image-layer difference image and a subtitle-layer difference image;
calculating a sum of absolute difference (SAD) of each pixel in the image-layer difference image and the subtitle-layer difference image as a motion error corresponding to each motion-estimation process; and
comparing the motion error corresponding to each motion-estimation process to determine the motion estimation having the smallest motion error.

17. The method as claimed in claim 11, further comprising:
determining whether there is motion difference between each reference image and its subsequent reference image;
in response to determining that there is motion difference between each reference image and its subsequent reference image, generating a motion-compensated-frame-interpolation enable signal at a high-logic state; and
in response to determining that there is no motion difference between each reference image and its subsequent reference image, generating the motion-compensated-frame-interpolation enable signal at a low-logic state.

18. The method as claimed in claim 17, further comprising:
calculating a number M of images required for frame interpolation between each reference image and its subsequent reference image according to the original frame rate and the display frame rate, where M is natural number; and
in response to the motion-compensated frame-interpolation enable signal being in the high-logic state, performing motion compensation to generate M interpolated image-layer images between each reference-image layer and its subsequent reference-image layer, and to generate M interpolated subtitle-layer images between each reference-subtitle layer and its subsequent reference-subtitle layer; and
in response to the motion-compensated frame-interpolation enable signal being in the low-logic state, performing motion compensation to generate M interpolated subtitle-layer images between each reference-subtitle layer and its subsequent reference-subtitle layer.

19. The method as claimed in claim 18, further comprising:
organizing the reference images and the interpolated images into a first video sequence; and
assigning a corresponding first timestamp to each image in the first video sequence, and assigning a corresponding second timestamp to each output image.

20. The method as claimed in claim 19, wherein the step of performing a frame-rate-conversion process on the reference images and the interpolated images according to the original frame rate and a display frame rate of an output video signal displayed by the video-image-interpolation apparatus to obtain the output video signal comprises:
comparing the second timestamp of each output image and the first timestamp of a specific image in the first video sequence that is closest to each output image;
when the second timestamp is earlier than the first timestamp, selecting a previous image of the specific image as the output image; and
when the second timestamp is later than or equal to the first timestamp, selecting the specific image as the output image.

* * * * *